US012644282B2

(12) United States Patent
Koyama et al.

(10) Patent No.: US 12,644,282 B2
(45) Date of Patent: Jun. 2, 2026

(54) PANEL STRUCTURE MANUFACTURING DEVICE AND PANEL STRUCTURE MANUFACTURING METHOD

(71) Applicants: MITSUBISHI HEAVY INDUSTRIES, LTD., Tokyo (JP); Mitsubishi Heavy Industries Machinery Systems, Ltd., Hyogo (JP)

(72) Inventors: Takayuki Koyama, Tokyo (JP); Kiyoka Takagi, Tokyo (JP); Katsuya Sennyu, Hyogo (JP); Yoshinao Takakuwa, Hyogo (JP); Takayuki Miyake, Hyogo (JP); Katsuhide Aikawa, Hyogo (JP)

(73) Assignees: MITSUBISHI HEAVY INDUSTRIES, LTD., Tokyo (JP); MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 325 days.

(21) Appl. No.: 18/286,271

(22) PCT Filed: Feb. 14, 2022

(86) PCT No.: PCT/JP2022/005715
§ 371 (c)(1),
(2) Date: Oct. 10, 2023

(87) PCT Pub. No.: WO2022/219910
PCT Pub. Date: Oct. 20, 2022

(65) Prior Publication Data
US 2024/0191502 A1 Jun. 13, 2024

(30) Foreign Application Priority Data
Apr. 16, 2021 (JP) ................................. 2021-069991

(51) Int. Cl.
| *B29C 65/08* | (2006.01) |
| *B29C 65/32* | (2006.01) |
| *E04C 2/32* | (2006.01) |

(52) U.S. Cl.
CPC .............. *E04C 2/324* (2013.01); *B29C 65/08* (2013.01); *B29C 65/32* (2013.01)

(58) Field of Classification Search
CPC ....... B29C 65/08; B29C 65/086; B29C 65/32; B29C 65/72; B29C 66/0342; E04C 2/322; E04C 2/324
(Continued)

(56) References Cited

U.S. PATENT DOCUMENTS

| 4,132,581 A | 1/1979 | Swartz | |
| 10,323,413 B1 * | 6/2019 | Biesiadecki | .............. E04C 2/06 |
| 2005/0095405 A1 | 5/2005 | Park et al. | |
| 2020/0130320 A1 | 4/2020 | Sei | |

FOREIGN PATENT DOCUMENTS

| EP | 3 517 278 | 7/2019 |
| JP | S51-18468 | 6/1976 |
(Continued)

OTHER PUBLICATIONS

Office Action issued Jul. 9, 2024 in corresponding Japanese Patent Application No. 2021-069991 English translation thereof).
(Continued)

*Primary Examiner* — James D Sells
(74) *Attorney, Agent, or Firm* — Wenderoth, Lind & Ponack, L.L.P.

(57) ABSTRACT

A panel structure manufacturing device includes a shaping device that shapes the surface of a thermoplastic resin into a relief shape and forms a plate-like core member; a heating device that selectively heats the surface of the core member; and a pressurizing device that pressurizes a heated spot of the core member that the heating device has heated and a
(Continued)

plate-like face plate, and fuses together the core member and the face plate.

10 Claims, 7 Drawing Sheets

(58) Field of Classification Search
USPC ....................................................... 156/73.1
See application file for complete search history.

(56) References Cited

FOREIGN PATENT DOCUMENTS

| | | |
|---|---|---|
| JP | 2006-185696 | 7/2006 |
| JP | 2006-335465 | 12/2006 |
| JP | 2007-263252 | 10/2007 |
| JP | 2018-99883 | 6/2018 |
| JP | 2019-188802 | 10/2019 |
| WO | 2013/146634 | 10/2013 |

OTHER PUBLICATIONS

Extended European Search Report issued Oct. 7, 2024 in European Patent Application No. 22787838.6.
Translation of International Search Report issued Mar. 15, 2022 in corresponding International (PCT) Application No. PCT/JP2022/005715.
Written Opinion issued Mar. 15, 2022 in corresponding International (PCT) Application No. PCT/JP2022/005715, with English translation.

* cited by examiner

HEADING SECTION — 42

CONTROL DEVICE — 20

HEATING SECTION — 42

CONTROL DEVICE — 20

FIG. 8

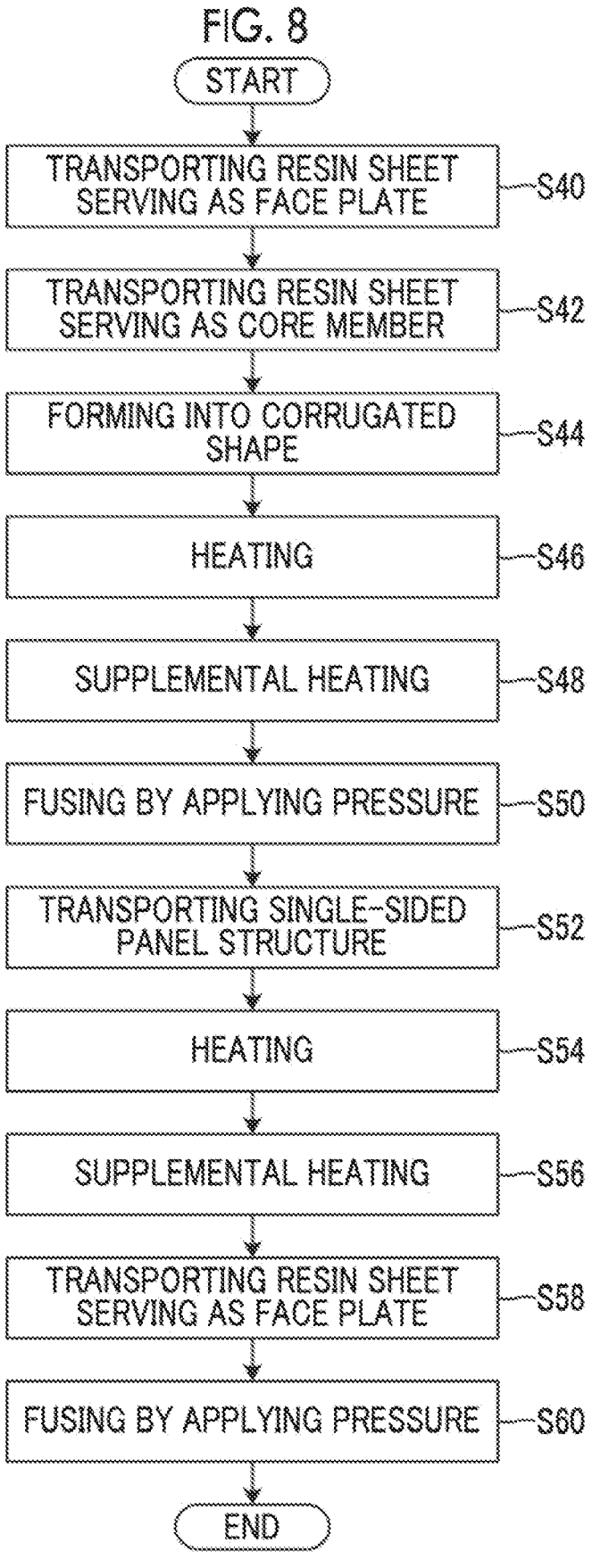

START

TRANSPORTING RESIN SHEET SERVING AS FACE PLATE — S40

TRANSPORTING RESIN SHEET SERVING AS CORE MEMBER — S42

FORMING INTO CORRUGATED SHAPE — S44

HEATING — S46

SUPPLEMENTAL HEATING — S48

FUSING BY APPLYING PRESSURE — S50

TRANSPORTING SINGLE-SIDED PANEL STRUCTURE — S52

HEATING — S54

SUPPLEMENTAL HEATING — S56

TRANSPORTING RESIN SHEET SERVING AS FACE PLATE — S58

FUSING BY APPLYING PRESSURE — S60

END

PANEL STRUCTURE MANUFACTURING DEVICE AND PANEL STRUCTURE MANUFACTURING METHOD

TECHNICAL FIELD

The present disclosure relates to a panel structure manufacturing device and a panel structure manufacturing method.

BACKGROUND ART

A technique capable of manufacturing a composite sheet by fusing a plurality of sheets using an ultrasonic fusion machine is known (for example, Japanese Unexamined Patent Application Publication No. 2019-188802).

Patent Literature

It has been studied to manufacture a sandwich panel containing a thermoplastic resin by fusion, which is used fox automobiles, trains, other mobility products, building materials, and the like, using a corrugator that manufactures a corrugated cardboard in the related art. In order to fuse two thermoplastic resins, it is necessary to apply appropriate heat and pressure to the thermoplastic resins. However, depending on a type of a resin material of the thermoplastic resin and a temperature rise state, the pressure may be insufficient and a panel structure may not be manufactured appropriately.

An object of the present disclosure is to provide a panel structure manufacturing device and a panel structure manufacturing method capable of appropriately manufacturing a panel structure by fusion.

SUMMARY OF THE INVENTION

A panel structure manufacturing device according to one aspect of the present disclosure includes a forming device that forms a core member having a plate shape by forming a surface of a thermoplastic resin into an undulating shape, a heating device that selectively heats a surface of the core member, and a pressurizing device that pressurizes a heating location of the core member heated by the heating device and a face plate having a plate shape to fuse the core member and the face plate.

A panel structure manufacturing method according to another aspect of the present disclosure includes a step of forming a core member having a plate shape by forming a surface of a thermoplastic resin into an undulating shape, a step of selectively heating a surface of the core member, and a step of pressurizing a heating location of the core member heated by the heating device and a face plate having a plate shape to fuse the core member and the face plate.

Advantageous Effects of Invention

According to the present disclosure, the panel structure can be appropriately manufactured by heat fusion.

BRIEF DESCRIPTION OF DRAWINGS

FIG. 38 is a diagram for explaining an example of the undulating shape of the core member according to the first embodiment.

FIG. 8 is a flowchart showing an example of a panel structure manufacturing method according to the second embodiment.

DETAILED DESCRIPTION OF THE INVENTION

Hereinafter, embodiments according to the present invention will be described in detail with reference to the accompanying drawings. The present invention is not limited by the embodiments. In a case where there are a plurality of the embodiments, the present invention also includes those configured by combining the embodiments. In addition, in the following embodiments, the same parts are denoted by the same reference signs, and the duplicate descriptions will not be repeated.

First Embodiment

Figure 1:
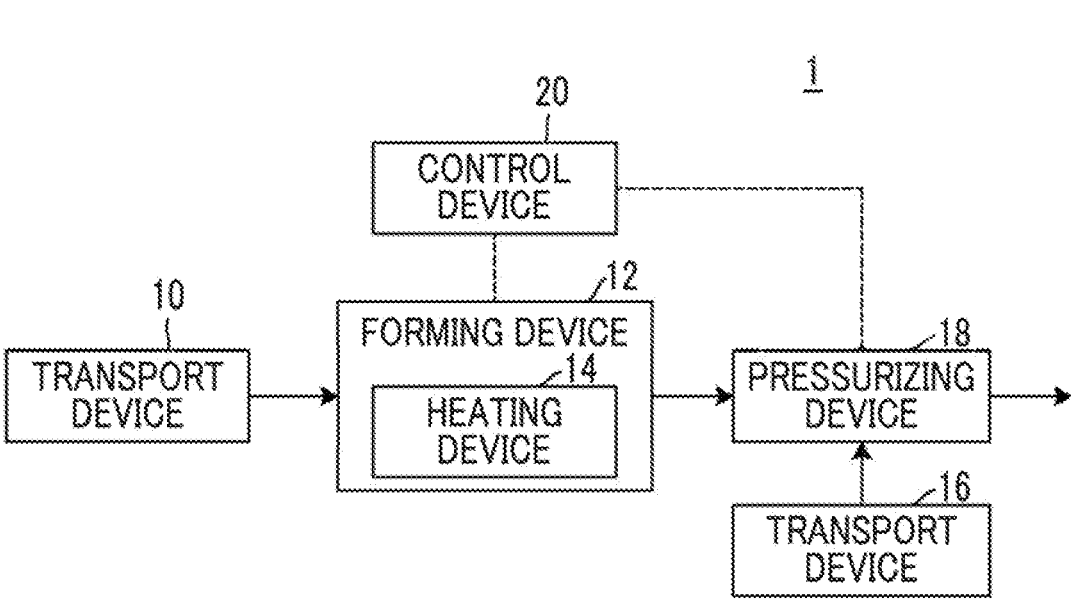
FIG. 1 is a block diagram showing a configuration example of a manufacturing device for manufacturing a panel structure according to a first embodiment by heat fusion.

A manufacturing device for manufacturing a panel structure according to a first embodiment by heat fusion will be described with reference to FIG. 1. FIG. 1 is a block diagram showing a configuration example of a manufacturing device for manufacturing a panel structure according to the first embodiment by heat fusion.

As shown in FIG. 1, a panel structure manufacturing device 1 includes a first transport device 10, a forming device 12, a heating device 14, a second transport device 16, a pressurizing device 18, and a control device 20. The manufacturing device 1 is a device capable of appropriately manufacturing a panel structure by appropriately fusing a core member and a face plate.

The first transport device 10 transports a thermoplastic resin sheet serving as the core member of the panel structure to the forming device 12. Examples of a thermoplastic resin transported by the transport device 10 include, but are not limited to, a polyamide resin, a polypropylene resin, an ABS resin, a polyetheretherketone, a polyetherketoneketone, and a polyphenylene sulfide. The thermoplastic resin is preferably thermoplastic fiber reinforced plastics (FRP) containing reinforcing fibers. The fiber reinforced plastics are preferably, for example, glass fiber reinforced plastics (GFRP) and carbon fiber reinforced plastics (CFRP).

The forming device 12 forms a surface of the thermoplastic resin transported from the transport device into an undulating shape to produce a core member. The undulating shape may include various shapes such as a single-sided protrusion shape in which protrusions are formed on only one surface, a double-sided protrusion shape in which protrusions are formed on both surfaces, and a corrugated shape in which both surfaces are formed in a corrugated shape. The forming device 12 may form the core member by forming the surface of the thermoplastic resin into other shapes.

Figure 3A:
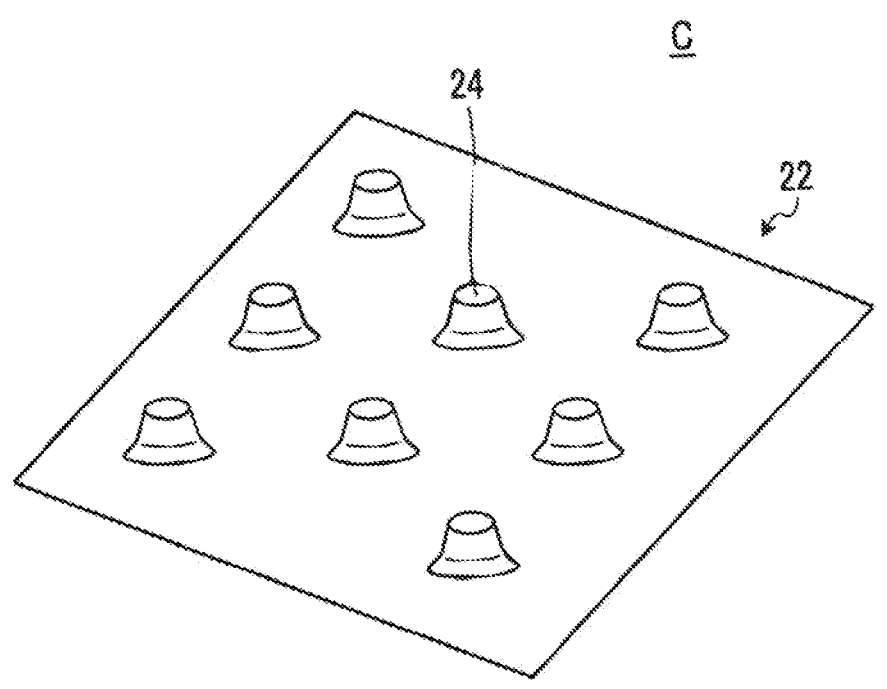
FIG. 3A is a diagram for explaining an example of the undulating shape of the core member according to the first embodiment.
Figure 3B:
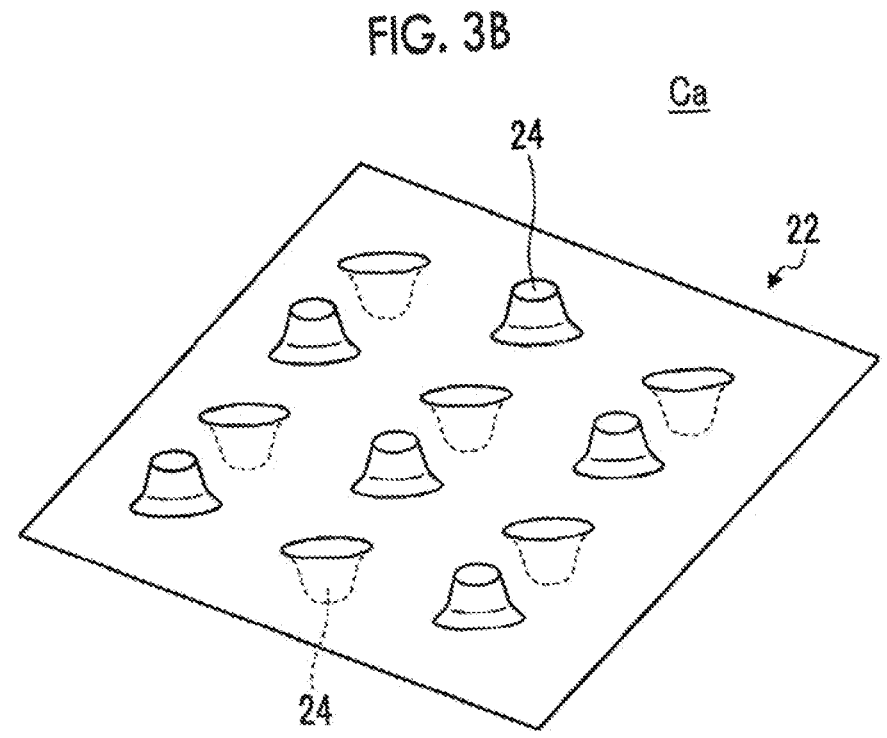
FIG. 3C is a diagram for explaining an example of the undulating shape of the core member according to the first embodiment.
Figure 3C:
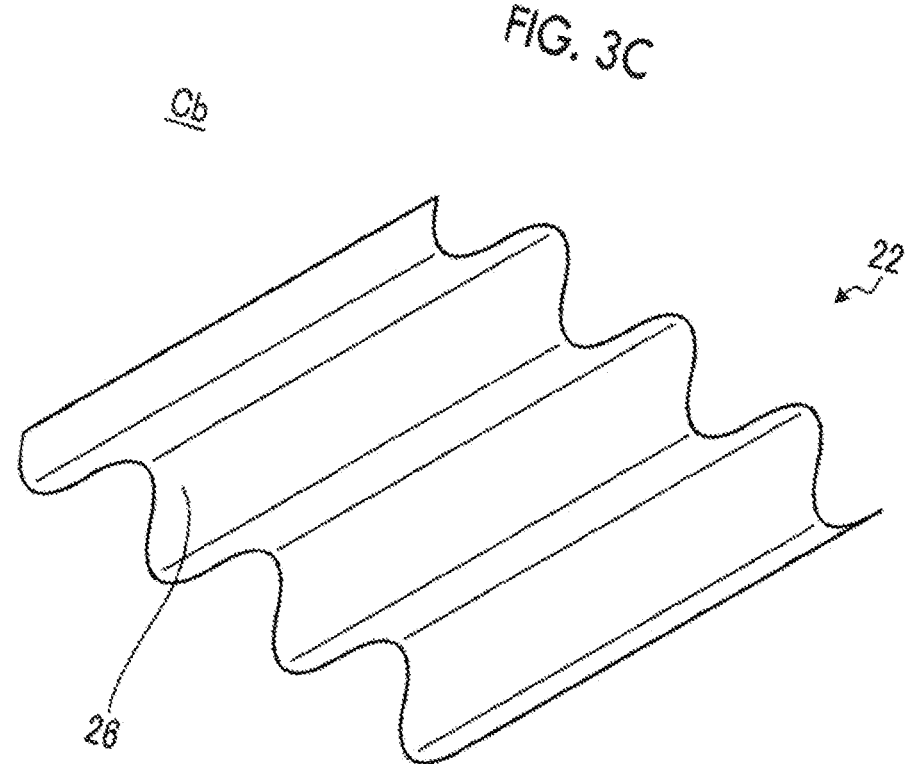

The undulating shape of the core member formed by the forming device 12 will be described with reference to FIGS. 3A, 3B, and 3C. FIGS. 3A to 3C are diagrams for explaining examples of the undulating shape of the core member according to the first embodiment.

As shown in FIG. 3A, a core member C may have a shape in which a plurality of protrusions 24 are formed on one surface of a resin sheet 22. In this case, the forming device 12 forms the core member C by forming the protrusions 24 on one surface of the resin sheet 22.

As shown in FIG. 3B, a core member Ca may have a shape in which a plurality of the protrusions 24 are formed on both surfaces of the resin sheet 22. In this case, the forming device 12 forms the core member Ca by forming the protrusions 24 on both surfaces of the resin sheet 22.

As shown in FIG. 3C, a core member Cb may have a corrugated portion 26 having a corrugated shape on a surface of the resin sheet 22. In this case, the forming device 12 forms the core member Cb by forming the corrugated portions 26 on both surfaces of the resin sheet 22.

The heating device 14 heats the surface of the thermoplastic resin formed by the forming device 12. The heating device 14 heats, for example, an apex of an uneven portion formed or, the surface of the thermoplastic resin. For example, the heating device 14 may selectively heat the apex of the uneven portion formed on the surface of the thermoplastic resin. The heating device 14 may perform heating, for example, in a range of 150° C. to 350° C., but a heating temperature is not limited thereto. The heating device 14 is provided, for example, inside the forming device 12. The heating device 14 transports the heated thermoplastic resin to the pressurizing device 18.

The transport device 16 transports the thermoplastic resin sheet serving as the face plate of the panel structure to the pressurizing device 18. Examples of the thermoplastic resin transported by the transport device 16 include, but are not limited to, a polyamide resin, a polypropylene resin, an ABS resin, a polyetheretherketone, a polyetherketoneketone, and a polyphenylene sulfide. The thermoplastic resin is preferably thermoplastic fiber reinforced plastics containing reinforcing fibers. The fiber reinforced plastics are preferably, for example, glass fiber reinforced plastics and carbon fiber reinforced plastics. The material of the thermoplastic resin sheet transported by the transport device 16 may be the same as or different from the material of the thermoplastic resin sheet transported by the transport device 10.

The pressurizing device 18 pressurizes and fuses thermoplastic resin sheet serving as the core member of the panel structure transported from the forming device 12, and the thermoplastic resin sheet serving as the face plate of the panel structure transported from the second transport device 16. For example, the pressurizing device 18 selectively pressurizes a portion heated by the heating device 14 to fuse the thermoplastic resin sheet serving the core member of the panel structure transported from the forming device 12, and the thermoplastic resin sheet serving as the face plate of the panel structure transported from the transport device 16. The pressurizing device 18 manufactures the panel structure having the face plate on one surface.

The control device 20 controls each part of the manufacturing device 1. For example, the control device 20 controls the heating device 14 to control a timing of heating the thermoplastic resin. For example, the control device 20 controls the pressurizing device 19 to control a timing of pressurizing the thermoplastic resin sheet transported from the forming device 12 and the thermoplastic resin sheet transported from the transport device 16.

Figure 2:
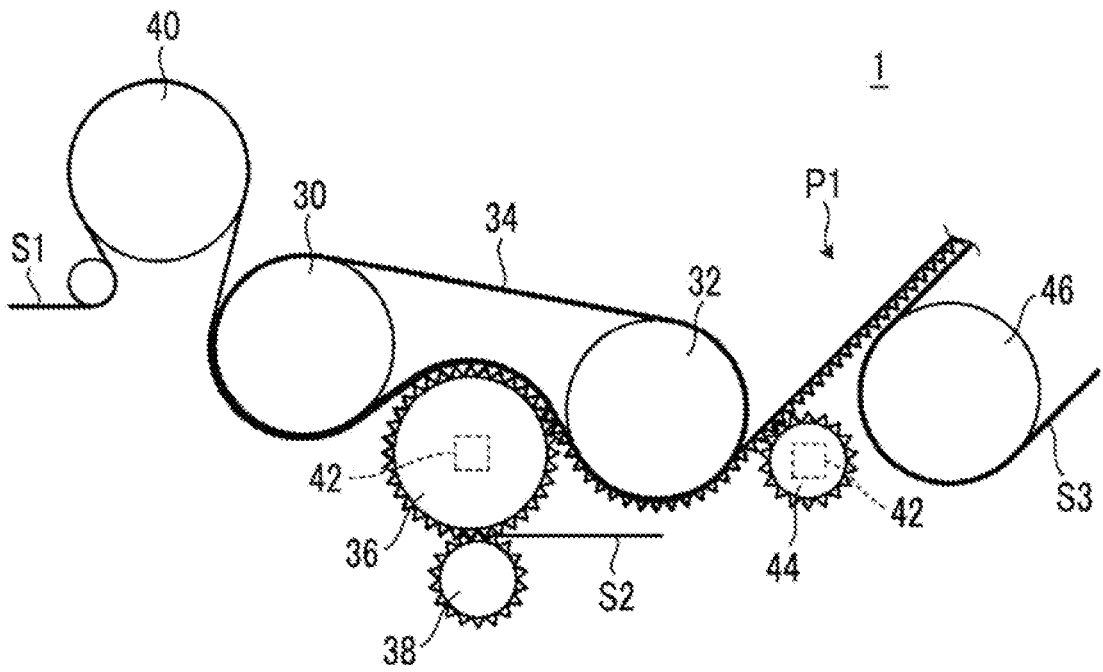
FIG. 2 is a diagram schematically showing a configuration of the manufacturing device according to the first embodiment.

The details of the manufacturing device according to the first embodiment will be described with reference to FIG. 2. FIG. 2 is a diagram schematically showing a configuration of the manufacturing device according to the first embodiment.

As shown in FIG. 2, the manufacturing device 1 includes a belt roll 30, a tension roll 32, a pressurizing belt 34, a first roll 36, a second roll 38, a first guide roll 40, a heating section 42, a third roll 44, and a second guide roll 46.

The belt roll 30, the tension roll 32, the pressurizing belt 34, the first roll 36, and the second roll 38 can also be referred to as a single facer forming a single-sided panel structure. The third roll 44 and a pressurizing device (not shown) in a subsequent stage can also be referred to as a double facer forming a double-sided panel structure.

The belt roll 30 can be driven to rotate by a drive device (not shown). The tension roll 32 is rotatably supported at a predetermined interval from the belt roll 30. The pressurizing belt 34 is an endless belt and is hung between the belt roll 30 and the tension roll 32.

The first roll 36 can be driven to rotate by a drive device (not shown), and an outer peripheral surface thereof is formed in a corrugated shape. In other words, the first roll 36 may be a gear. The first roll 36 is disposed below the pressurizing belt 34 in a Z direction between the belt roll 30 and the tension roll 32, and the outer peripheral surface having a corrugated shape abuts on a lower surface of the pressurizing belt 34 in a pressurized state. The belt roll 30, the tension roll 32, and the pressurizing belt 34 may be a type of the pressurizing device 13 shown in FIG. 1. The belt roll 30, the tension roll 32, and the pressurizing belt 34 may also be referred to as a pressurizing mechanism.

An outer peripheral surface of the second roll 38 is formed in a corrugated shape. That is, the second roll 38 may be a gear. The outer peripheral surface of the second roll 38 is formed in a corrugated shape so as to mesh with the first roll 36. The second roll 38 meshes with the outer peripheral surface of the first roll 36 below the first roll 36 in the Z direction.

A resin sheet S1 made of a thermoplastic resin serving as the face plate of the panel structure is wound around the first guide roll 40. As the belt roll 30 rotates, the resin sheet S1 is transported together with the pressurizing belt 34 to a gap between the pressurizing belt 34 and the first roll 36. Here, it is preferable that the resin sheet S1 is transported in a state of being heated to a temperature equal to or higher than a predetermined temperature for fusion with a resin sheet S2. The predetermined temperature can be arbitrarily changed depending on the type of resin and the like. The belt roll 30 and the first guide roll 40 may be a type of the first transport device 10 shown in FIG. 1.

The resin sheet S2 made of a thermoplastic resin serving as the core member of the panel structure is transported to a gap between the first roll 36 and the second roll 38 by a transport device (not shown) or the like. The first roll 36 and the second roll 38 form the surface of the resin sheet S2 into a corrugated shape at a meshing portion. The first roll 36 and the second roll 38 may be the forming device 12 shown in FIG. 1.

The first roll 36 includes the heating section 42. The resin sheet S2 whose surface is formed into a corrugated shape is transported to a gap between the pressurizing belt 34 and the first roll 36 by the first roll 36 while being heated by the heating section 42.

Figures 4A, 4B:
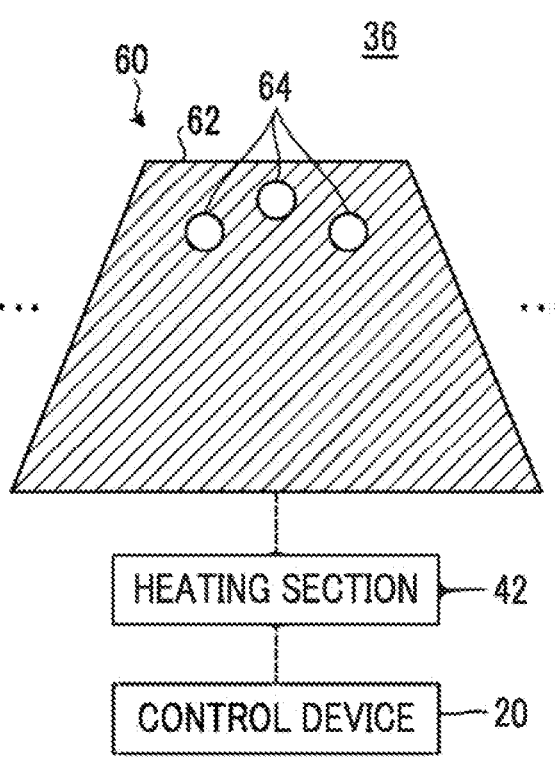
FIG. 4A is a diagram for explaining a method for heating a resin sheet according to the first embodiment.
FIG. 4B is a diagram for explaining a method for heating the resin sheet according to the first embodiment.

A method for heating the resin sheet according to the first embodiment will be described with reference to FIGS. 4A and 4B. FIGS. 4A and 4B are diagrams for explaining a method for heating the resin sheet according to the first embodiment.

FIG. 4A shows a tooth portion (tooth) 60 which is one of the corrugated shapes formed on an outer diameter of the first roll 36 (which forms the heating device 14 comprising a gear). As shown in FIG. 4A, the tooth portion 60 has a hole portion (hole) 64 in a tip portion 62. In FIG. 4A, the number of the hole portions (holes) 64 is "three", but the number of the hole portions 64 may be larger or smaller than "three". The number, position, and size of the hole portions 64 can be arbitrarily changed according to a design.

The heating section 42 may be, for example, a heat generating device having an electric heating wire (not shown). For example, the heating section 42 can heat at least a part of the tip portion 62 of the first roll (gear) 36 by passing the electric heating wire through the hole portion 64 and causing the electric heating wire to generate heat. In this case, the heating section 42 heats the resin sheet S2 by the tip portion 62 of the first roll (forming device in the form of a gear) 36 heated by the electric heating wire.

The heating section 42 may be, for example, a steam generator that ejects high-temperature steam. In this case, the heating section 42 heats at least a part of the tip portion 62 of gear 36 by ejecting the high-temperature steam from the hole portion 64. In this case, the heating section 42 heats the resin sheet S2 by the tip portion 62 heated by the high-temperature steam.

The heating section 42 may be, for example, a magnetic field heating device having an exciting coil. In this case, for example, the heating section 42 generates a magnetic field outside the tooth portion 60 and heats the resin sheet S2 using an inductive resistance. The heating section 42 heats the resin sheet S2, for example, by applying a magnetic field to the tip portion 62 of the tooth portion 60 to cause the tip portion 62 to generate heat by the inductive resistance. In a case where the resin sheet S1 is not transported in a state of being heated to a predetermined temperature or higher, the heating section 42 may also heat the resin sheet S2.

As shown in FIG. 4B, the hole portion 64 may be formed in a valley portion 66 between the tooth portion 60 and the tooth portion 60 in the first roll 36. Specifically, in a case where the resin sheet S2 and a resin sheet S3 are fused as described later, the valley portion 66 may be heated by passing the electric heating wire or the high-temperature steam through the hole portions 64 formed in the valley portion 66.

The heating section 42 preferably selectively heats the resin sheet S2. It is preferable that the heating section 42 selectively heats an apex portion of the corrugated shape of the surface of the resin sheet S2. Specifically, it is preferable that the heating section 42 selects and heats a fusing portion among the apex portions of the corrugated shape of the surface of the resin sheet S2.

The control device 20 controls the heating section 42 to heat the resin sheet S2. For example, the control device 20 controls the heating section 42 to heat the tooth portion (tooth) 60 immediately after the forming of the core member by the first roll (gear) 36 is completed. The control device 20 controls the heating section 42 to selectively heat the apex portion of the corrugated shape of the resin sheet (core member) S2. Specifically, the control device 20 controls the heating section 42 to select and heat the fusing portion among the apex portions of the corrugated shape of the surface of the resin sheet S2. The control device 20 controls the heating section 42 to heat the heating section 42 to a desired temperature immediately before the resin sheet (face plate) S1 and the resin sheet (core member) S2 are fused. Since it is preferable that the resin sheets are quickly cooled after the fusion, the control device 20 controls the heating section 42 such that the heating is completed in a range of about ¼ to ½ rotation immediately before the fusion in one rotation of the first roll (gear) 36.

When the heating of the resin sheet S2 is completed, the resin sheet S1 and the resin sheet S2 are fused by being pressurized by the pressurizing belt 34. A fused portion is formed by cooling a fused location between the resin sheet S1 and the resin sheet S2. As a result, a single-sided panel structure P1 in which the face plate is provided on only one surface is formed.

Further, a cooling device (not shown) that coils the resin sheet S1 and the resin sheet S2 after the resin sheet S1 and the resin sheet S2 are fused may be provided. In this case, the cooling device may be configured to cool at least the fused location after the resin sheet S1 and the resin sheet S2 are fused. The cooling device may have a water cooling structure for cooling using cooling water, or may have an air cooling structure for cooling using cooling air. By providing the cooling device, the resin sheet S1 and the resin sheet S2 can be appropriately cooled.

Further, although not shown, a pressurizing force adjusting device capable of adjusting a pressurizing force between the first roll 36 and the pressurizing belt 34 is provided. For example, the pressurizing force adjusting device has a hydraulic cylinder, and a tip portion of a drive rod thereof is connected to a supporting shaft of the tension roll 32. Therefore, the tension of the pressurizing belt 34 is adjusted by moving the tension roll 32 toward and away from the belt roll 30 by the hydraulic cylinder, and thus the pressurizing force to the resin sheet S1 and the resin sheet S2 which are transported between the first roll 36 and the pressurizing belt 34 can be adjusted.

Returning to FIG. 2, the single-aided panel structure kl is transported to a gap between the tension roll 32 and the third roll 44.

The third roll 44 has the heating section 42. An outer peripheral surface of the third roll. 44 is formed in a corrugated shape. That is, the third roll 44 may be a gear. The third roll 44 is formed to mesh with the corrugated shape of the surface of the resin sheet S2. The single-sided panel structure P1 is transported to a pressurizing device including a pressurizing belt (not shown) by the third roll 44 while the resin sheet S2 whose surface where the resin sheet S1 is not fused is formed in a corrugated shape is heated by the heating section 42.

The resin sheet S3 made of a thermoplastic resin serving as the face plate of the panel structure is wound around the second guide roll 46 and transported to a pressurizing device (not shown).

In the single-sided panel structure P1, when the heating of the resin sheet S2 whose surface where the resin sheet S1 is not fused is formed into a corrugated shape is completed, the resin sheet S2 and the resin sheet S3 are fused by being pressurized by a pressurizing device (not shown). A fused portion is formed by cooling a fused location between the resin sheet S2 and the resin sheet S. As a result, a double-sided panel structure having the face plates on both surfaces of the core member is formed.

Further, a cooling device (not shown) that cools the resin sheet S2 and the resin sheet S3 after the resin sheet S2 and the resin sheet S3 are fused may be provided. In this case, the cooling device may be configured to cool at least the fused location after the resin sheet S2 and the resin sheet S3 are fused. The cooling device may have a water cooling structure for cooling using cooling water, or may have an air cooling structure for cooling using cooling air. By providing the cooling device, the resin sheet S2 and the resin sheet S3 can be appropriately cooled.

[Panel Structure Manufacturing Method]

Figure 5:
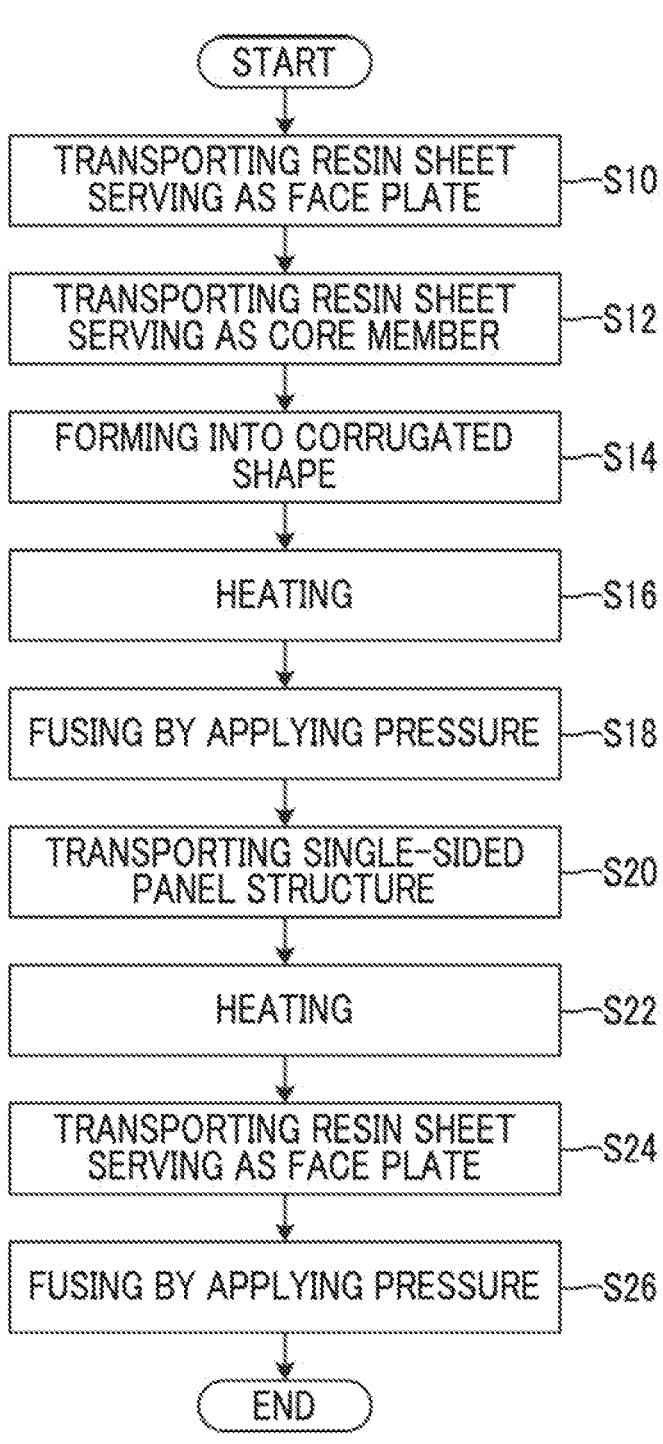
FIG. 5 is a flowchart showing an example of a panel structure manufacturing method according to the first embodiment.

A panel structure manufacturing method according to the first embodiment will be described with reference to FIG. 5. FIG. 5 is a flowchart showing an example of the panel structure manufacturing method according to the first embodiment.

First, the belt roll 30 and the first guide roll 40 transport the resin sheet S1 serving as the face plate to a gap between the pressurizing belt 34 and the first roll 36 (step S10). A transport device or the like (not shown) transports the resin sheet S2 serving as the core member to a gap between the first roll 36 and the second roll 38 (step S12).

The first roll 36 and the second roll 38 form the surface of the resin sheet S2 into a corrugated shape at the meshing portion (step S14). The beating section 42 provided on the first roll 36 selectively heats the apex portion of the corrugated shape on one surface of the resin sheet S2 (step S16).

The pressurizing belt 34 fuses the resin sheet S1 and the resin sheet S2 by applying pressure to the resin sheet S1 and a heated location of the resin sheet S2 (step S18). As a result, the single-sided panel structure P1 is formed.

The pressurizing belt 34 and the first roll 36 transport the single-sided panel structure P1 to a gap between the tension roll 32 and the third roll 44 (step S20). The heating section 42 provided on the third roll 44 selectively heats the apex portion of the corrugated shape on the other surface of the resin sheet S2 (step S22). A transport device or the like (not shown) transports the resin sheet S3 serving as the face plate, which is wound around the second guide roll 46, to a pressurizing device (not shown) (step S24).

A pressurizing device (not shown) fuses the resin sheet S2 and the resin sheet S3 by applying pressure to the heated location of the resin sheet S2 and the resin sheet S1 (step S26). As a result, the double-shied panel structure is formed.

As described above, in the first embodiment, a part of the corrugated shape of the resin sheet S2 serving as the core member is selectively heated, and pressure is applied to the resin sheet S1 or the resin sheet 83 serving as the face plate and the resin sheet S2 to fuse them together. Accordingly, in the first embodiment, the panel structure can be appropriately manufactured by heat fusion.

Second Embodiment

Figures 6, 7:
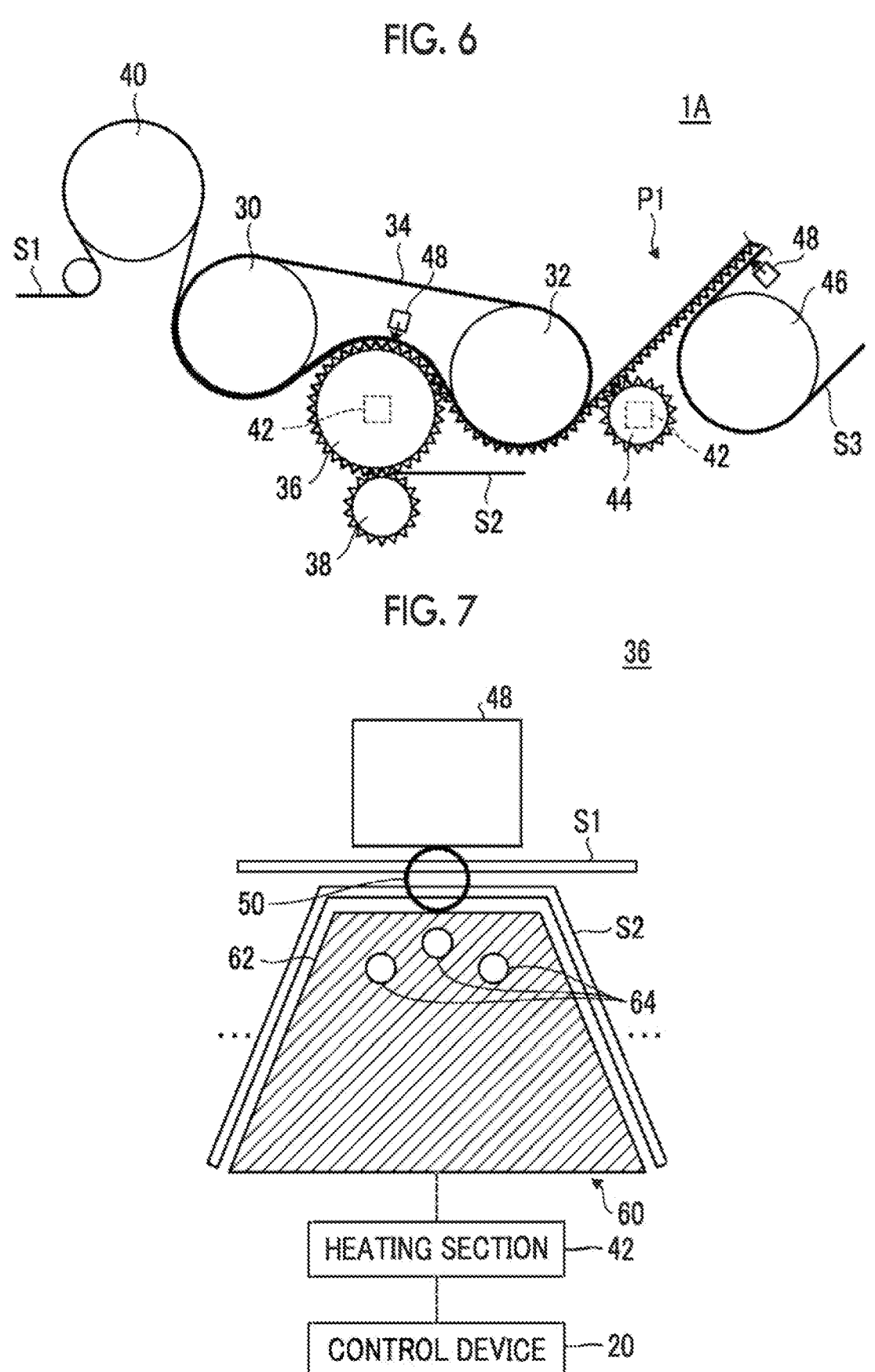
FIG. 6 is a diagram schematically showing a configuration of a manufacturing device according to a second embodiment.
FIG. 7 is a diagram for explaining a method for heating a resin sheet according to the second embodiment.

The details of a manufacturing device according to the second embodiment will be described with reference to FIG. 6. FIG. 6 is a diagram schematically showing a configuration of the manufacturing device according to the second embodiment.

As shown in FIG. 6, a manufacturing device 1A is different from the manufacturing device 1 shown in FIG. 2 in that a fusion assistance device 48 is provided.

The fusion assistance device 48 is provided in a pressurizing mechanism including the belt roll 30, the tension roll 32, and the pressurizing belt 34. The fusion assistance device 48 is provided, for example, in the vicinity of a location where the pressurizing belt 34 applies pressure. The fusion assistance device 48 has, for example, a function of assisting fusion when the pressurizing belt 34 fuses the resin sheet S1 and the resin sheet S2. The fusion assistance device 48 is, for example, an ultrasonic wave generator that heats a target by applying ultrasonic waves to the target.

A method for heating the resin sheet according to the second embodiment will be described with reference to FIG. 7. FIG. 7 is a diagram for explaining a method for heating the resin sheet according to the second embodiment.

FIG. 7 shows the tooth portion 60, which is one of the corrugated shapes formed on the outer diameter of the first roll 36, and the fusion assistance device 48.

In the second embodiment, the heating section 42 causes the tip portion 62 of the tooth portion 60 to generate heat to heat a heating location 50 of the resin sheet S2. The fusion assistance device 48 irradiates the heating location 50 of the resin sheet S2 with ultrasonic waves to heat the heating location 50. That is, in the second embodiment, the resin sheet S1 and the resin sheet S2 are heated by using the heating section 42 and the fusion assistance device 48. As a result, in the second embodiment, a heat generation temperature generated by the heating section 42 can be lowered.

Returning to FIG. 6, the fusion assistance device 48 may be provided, for example, in a pressurizing device (not shown) that fuses the resin sheet S3 to the single-sided panel structure P1. In this case, the fusion assistance device 48 has, for example, a function of assisting fusion when the single-sided panel structure P1 and the resin sheet S2 are fused. Since a method for assisting the fusion with the fusion assistance device 48 is the same as the method for assisting the fusion between the resin sheet S1 and the resin sheet S2, the description thereof will not be repeated.

In the second embodiment, the fusion assistance device 48 has been described as an ultrasonic wave generator that emits ultrasonic waves, but this is an example and does not limit the present disclosure. The fusion assistance device 48 may be, for example, a pressure applying device that applies pressure to assist application of pressure by the pressurizing belt 34.

[Panel Structure Manufacturing Method]

A panel structure manufacturing method according to the second embodiment will be described with reference to FIG. 8. FIG. 8 is a flowchart showing an example of the panel structure manufacturing method according to the second embodiment.

Since steps S40 to S46, steps S50 to S54, and steps S58 to S60 are the same processes as steps S10 to S26, respectively, the description thereof will not be repeated.

After step 346, the fusion assistance device 48 supplementally heats the same location as the location heated by the heating section 42 (step S48). A process of step S46 and a process of step S48 may be performed at the same time.

After step 354, the fusion assistance device 48 supplementally heats the same location as the location heated by the heating section 42 (step 356). A process of step S54 and a process of step S56 may be performed at the same time.

As described above, in the second embodiment, when a part of the corrugated shape of the resin sheet S2 serving as the core member is selectively heated, the heated location is supplementally heated by the fusion assistance device 48. Accordingly, in the second embodiment, a heating temperature of the resin sheet S2 by the heating section 42 can be lowered. As a result, in the second embodiment, the resin sheet S2 can be easily cooled after being heated, so that a quality of a product can be improved.

Advantageous Effects

The panel structure manufacturing device and the panel structure manufacturing method described in the embodiments are understood as follows, for example.

The panel structure manufacturing device according to a first aspect includes the forming device 12 that forms the core member having a plate shape by forming the surface of the thermoplastic resin into an undulating shape, the heating device 14 that selectively heats the surface of the core member, and the pressurizing device 18 that pressurizes the heating location of the core member heated by the heating device 14 and the face plate having a plate shape to fuse the core member and the face plate.

The panel structure manufacturing device of the first aspect selectively heats the fused location with the face plate on the surface of the core member. The panel structure manufacturing device of the first aspect heats the core member and the face plate by pressurizing the heating location of the core member and the face plate. Accordingly, the panel structure manufacturing device of the first aspect can appropriately manufacture the panel structure by heat fusion.

The panel structure manufacturing device of the second aspect further includes the control device 20 that controls the heating timing of the heating device 14. Accordingly, the panel structure manufacturing device of the second aspect can appropriately control the heating timing when the core member and the face plate are fused.

In the panel structure manufacturing device of a third aspect, the forming device 12 forms the thermoplastic resin into a corrugated shape. Accordingly, in the panel structure manufacturing device of the third aspect, the panel structure in which the core member is formed in a corrugated shape can be manufactured by heat fusion.

In the panel structure manufacturing device of a fourth aspect, the heating device 14 heats the apex portion of the undulating shape formed on the core member. Accordingly, in the panel structure manufacturing device of the fourth aspect, the core member can be appropriately heated when the core member and the face plate are fused.

In the panel structure manufacturing device of a fifth aspect, the heating device 14 is provided in the forming device 12. Accordingly, in the panel structure manufacturing device of the fifth aspect, the core member can be heated by using the forming device 12. As a result, in the panel structure manufacturing device of the fifth aspect, the core member can be easily heated.

In the panel structure manufacturing device of a sixth aspect, the forming device 12 is a gear, the gear has hole portions in a ridge portion and a valley portion of the tooth portion, and the heating device 14 heats the core member by using the hole portions. Accordingly, in the panel structure manufacturing device of the sixth aspect, the core member can be heated while the forming device 12 meshes with the core member formed in a corrugated shape. As a result, in the panel structure manufacturing device of the sixth aspect, the core member can be appropriately heated.

In the panel structure manufacturing device of a seventh aspect, the heating device 14 heats the gear to heat the core member by using the electric heating wire passing through the hole portion or the steam passing through the hole portion. Accordingly, in the panel structure manufacturing device of the seventh aspect, the core member can be heated more appropriately.

In the panel structure manufacturing device of an eighth aspect, the forming device 12 is a gear, and the heating device 14 generates a magnetic field outside the gear and heats the core member by using the inductive resistance. Accordingly, in the panel structure manufacturing device of the eighth aspect, the core member can be heated more appropriately.

The panel structure manufacturing device of a ninth aspect further includes a fusion assistance device 48 that assists fusion between the core member and the face plate. Accordingly, the panel structure manufacturing device of the ninth aspect can assist the fusion between the core member and the face plate by the pressurizing device 18. Accordingly, the panel structure manufacturing device of the ninth aspect can more appropriately manufacture the panel structure by heat fusion.

In the panel structure manufacturing device of a tenth aspect, the fusion assistance device 48 is an ultrasonic heating device. Accordingly, in the panel structure manufacturing device according to the tenth aspect, the fusion assistance device 48 can supplementally heat the location heated by the heating device 14 when the core member is heated by the heating device 14 in order to fuse the core member and the face plate. As a result, the panel structure manufacturing device according to the tenth aspect can more appropriately manufacture the panel structure by heat fusion.

The panel structure manufacturing method according to an eleventh aspect includes a step of forming a core member having a plate shape by forming a surface of a thermoplastic resin into an undulating shape, a step of selectively heating a surface of the core member, and a step of pressurizing a heating location of the core member and a face plate having a plate shape to fuse the core member and the face plate.

The panel structure manufacturing method according to an eleventh aspect selectively heats the fused location with the face plate on the surface of the core member. In the panel structure manufacturing method according to the eleventh aspect, the core member and the face plate are heated by pressurizing the heating location of the core member and the face plate. Accordingly, the panel structure manufacturing method according to the eleventh aspect can appropriately manufacture the panel structure by heat fusion.

The embodiments of the present disclosure have been described above; however, the present invention is not limited by the contents of the embodiments. In addition, the above-described components include those that can be easily assumed by those skilled in the art, those that are substantially the same, and those that are within a so-called equivalent range. Further, the above-described components can be combined as appropriate. Further, various omissions, replacements, and modifications of the above-described components can be made without departing from the concept of the above-described embodiments.

REFERENCE SIGNS LIST

10, 16: transport device
12: forming device
14: heating device
18: pressurizing device
20: control device
30: belt roll
32: tension roll

34: pressurizing belt
36: first roll
38: second roll
40: first guide roll
42: heating section
44: third roll
46: second guide roll
46: fusion assistance device

The invention claimed is:

1. A panel structure manufacturing device comprising:

a forming device comprising a gear configured to form a core member having a plate shape by forming a surface of a thermoplastic resin into an undulating shape, the gear having a tooth;

a heating device configured to selectively heat a surface of the core member and a tip portion of the tooth of the gear;

a pressurizing device configured to pressurize a heating location of the core member heated by the heating device and a face plate having a plate shape to fuse the core member and the face plate; and a control device configured to control a heating timing of the heating device by controlling a heating section of the heating device to heat the tooth of the gear immediately after formation of the core member by the gear is completed, the heating being performed during a range of about ¼ to ½ of a rotation of the gear immediately before fusion of the core member and the face plate in one rotation of the gear.

2. The panel structure manufacturing device according to claim 1, wherein the undulating shape of the thermoplastic resin formed by the forming device is a corrugated shape.

3. The panel structure manufacturing device according to claim 1, wherein the heating device heats an apex portion of the undulating shape of the core member formed by the forming device.

4. The panel structure manufacturing device according to claim 1, wherein the heating device is in the forming device.

5. The panel structure manufacturing device according to claim 1, wherein the gear has holes in a ridge portion and a valley portion of the tooth, and the heating device is configured to heat the core member using the holes.

6. The panel structure manufacturing device according to claim 5, wherein the heating device is further configured to heat the gear to heat the core member by using an electric heating wire passing through the holes or steam passing through the holes.

7. The panel structure manufacturing device according to claim 1, wherein the heating device is further configured to generate a magnetic field outside the gear and to heat the core member using an inductive resistance.

8. The panel structure manufacturing device according to claim 1, further comprising a fusion assistance device configured to assist with fusion between the core member and the face plate.

9. The panel structure manufacturing device according to claim 8, wherein the fusion assistance device is an ultrasonic heating device.

10. A panel structure manufacturing method comprising:

forming a core member having a plate shape by forming a surface of a thermoplastic resin into an undulating shape using a gear;

selectively heating a surface of the core member by controlling a heating section to heat a tooth of the gear immediately after completing formation of the core member by the gear, the heating being performed during a range of about ¼ to ½ of a rotation of the gear immediately before fusion of the core member and the face plate in one rotation of the gear; and immediately after the selective heating, pressurizing a heating location of the core member and a face plate having a plate shape to fuse the core member and the face plate.

* * * * *